(12) United States Patent
Braverman et al.

(10) Patent No.: US 8,863,087 B2
(45) Date of Patent: Oct. 14, 2014

(54) COMPREHENSIVELY TESTING FUNCTIONALITY OF A COMPUTER PROGRAM BASED ON PROGRAM CODE CHANGES

(75) Inventors: Matthew R. Braverman, Tucson, AZ (US); David A. Brettell, Vail, AZ (US); Anthony J. Ciaravella, Tucson, AZ (US); Chuong H. Tran, Tucson, AZ (US); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 13/532,086

(22) Filed: Jun. 25, 2012

(65) Prior Publication Data

US 2013/0346947 A1   Dec. 26, 2013

(51) Int. Cl.
  *G06F 9/44* (2006.01)
(52) U.S. Cl.
  USPC .......................................................... 717/124
(58) Field of Classification Search
  None
  See application file for complete search history.

(56) References Cited

U.S. PATENT DOCUMENTS

| | | | | |
|---|---|---|---|---|
| 5,703,788 | A * | 12/1997 | Shei et al. ..................... | 716/102 |
| 5,778,169 | A * | 7/1998 | Reinhardt ..................... | 714/38.1 |
| 6,304,982 | B1 * | 10/2001 | Mongan et al. ............. | 714/38.14 |
| 6,662,357 | B1 * | 12/2003 | Bowman-Amuah .......... | 717/120 |
| 6,907,546 | B1 * | 6/2005 | Haswell et al. ............. | 714/38.11 |
| 7,315,826 | B1 * | 1/2008 | Guheen et al. ............... | 705/7.29 |
| 8,276,123 | B1 * | 9/2012 | Deng et al. .................... | 717/125 |
| 8,539,282 | B1 * | 9/2013 | Kabanov et al. ............. | 714/38.1 |
| 2005/0223361 | A1 * | 10/2005 | Belbute ........................ | 717/124 |
| 2007/0168744 | A1 * | 7/2007 | Pal et al. ......................... | 714/38 |
| 2009/0249298 | A1 * | 10/2009 | Blount et al. ................. | 717/125 |
| 2011/0145788 | A1 * | 6/2011 | Xu et al. ....................... | 717/121 |
| 2011/0161936 | A1 * | 6/2011 | Huang et al. .................. | 717/130 |
| 2012/0151455 | A1 * | 6/2012 | Tsantilis et al. .............. | 717/132 |

OTHER PUBLICATIONS

Newhall, Tia, "C Code Style Guidelines", Unix Help Pages, 2004.*
"C Code Style Guidelines" by Newhall, Published at www.cs.swarthmore.edu/~newhall/unixhelp/c_codestyle.htmlCachedSimilar 2004.*

* cited by examiner

*Primary Examiner* — Isaac Tecklu
*Assistant Examiner* — Hossain Morshed
(74) *Attorney, Agent, or Firm* — Nicholas L. Cadmus; Abdul-Samad A. Adediran

(57) ABSTRACT

A computer identifies one or more program functions within program code of a computer program affected by a program code change. The computer identifies program function calls made by the one or more program functions to other program functions. The computer adds the one or more program functions and program function calls to a program code database. The computer generates a mapping of relationships between the program functions of the program code. The computer selects one or more test scripts based on the mapping of relationships.

15 Claims, 4 Drawing Sheets

US 8,863,087 B2

COMPREHENSIVELY TESTING FUNCTIONALITY OF A COMPUTER PROGRAM BASED ON PROGRAM CODE CHANGES

BACKGROUND

1. Field of the Invention

The present invention relates generally to testing a computer program, and more particularly to comprehensively testing functionality of the computer program based on a change to program code.

2. Description of the Related Art

Testing of a computer program is frequently performed during software development to verify the computer program is functioning properly subsequent to a change made to program code of the computer program. However, when a change is made to the program code of the computer program oftentimes the functionality of the computer program may not be thoroughly tested prior to release to consumers. Generally, the functionality of the computer program is not thoroughly tested because the person testing the program code lacks a complete understanding of the change made to the program code. Therefore, without a complete understanding of the change made to the program code the person may not know all the parts of the computer program that are affected by the change and that need to be tested. Moreover, the computer program can be very complex, and as the complexity of the computer program increases even a seemingly minor change to the program code may have a large impact on functionality of the computer program. Thus, without an efficient approach for testing the computer program it may be difficult to comprehensively test the functionality of the computer program.

Existing approaches for testing functionality of a computer program affected by a program code change can be extremely time consuming and susceptible to increased human error. Specifically, the existing approaches involve a person reading a note that corresponds with the computer program, and from the note determining what test cases to apply and test scripts to execute in order to test the functionality of the computer program affected by the program code change. Typically, the note indicates what changes were made to the program code. For example, the note may state that program code change 1 does X, program code change 2 does Y, and program code change 3 does Z, and so forth. However, the person reading the note may not completely understand each program code change, and as a result may not know the correct test case to apply and the correct test script to run in order to test the appropriate functionality of the computer program. As a result, if the computer program is not properly tested the computer program may not be reliable for use by consumers. Thus, the challenge of comprehensively testing functionality of a computer program based on a change to program code continues to persist.

SUMMARY

Aspects of an embodiment of the present invention disclose a method, computer system, and program product for comprehensively testing functionality of a computer program based on a change to program code of the computer program. A computer identifies one or more program functions within program code of a computer program affected by a program code change. The computer identifies program function calls made by the one or more program functions to other program functions. The computer adds the one or more program functions and program function calls to a program code database. The computer generates a mapping of relationships between the program functions of the program code. The computer selects one or more test scripts based on the mapping of relationships.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

Figure 1:
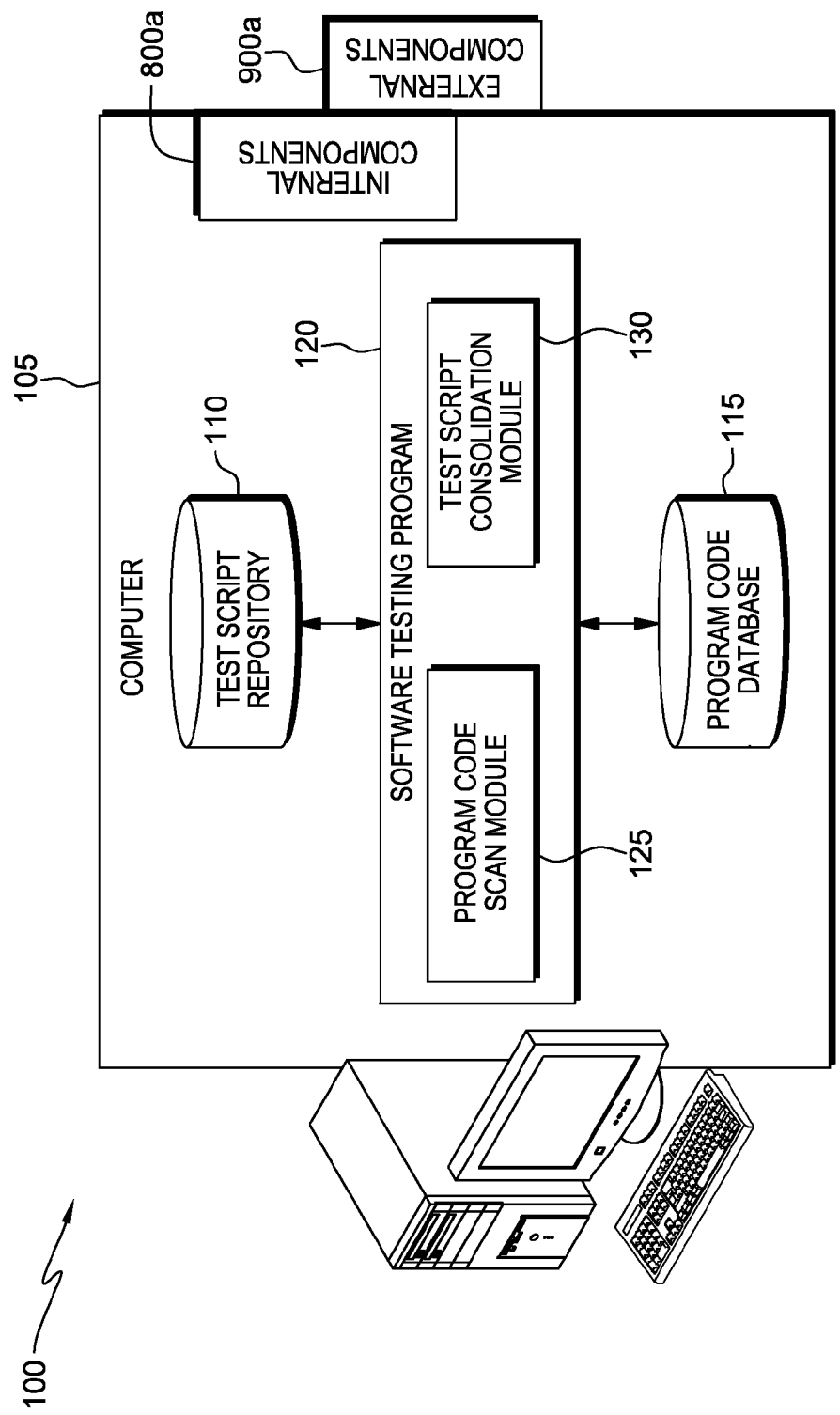
FIG. 1 is a block diagram of a computer system having a computer that is utilizing a test script repository, a program code database, and a software testing program having a program code scan module and a test script consolidation module for comprehensively testing functionality of a computer program, based on a change to program code of the computer program according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a software testing program, installed on a computer, for comprehensively testing functionality of a computer program based on a change to program code of the computer program. Specifically, the software testing program determines a program code change made to the computer program as well as any test scripts that need to be executed to test the program code change. Subsequently, software testing program consolidates the test scripts into a test suite (i.e., a single executable test script) that can be utilized to comprehensively test the functionality of the computer program that is affected by the program code change.

FIG. 1 illustrates computer system 100 that includes computer 105. Computer 105 includes the following components: test script repository 110, program code database 115, and software testing program 120 having program code scan module 125 and test script consolidation module 130. In addition, computer 105 includes internal components 800a and external components 900a, as described below in more detail with respect to FIG. 4.

In the disclosed embodiment, test script repository 110 is a computer readable tangible storage device that maintains test scripts for testing a computer program, wherein the computer program is any computer program code having functionality to be tested. Particularly, the purpose of each test script within test script repository 110 is to comprehensively test specific functionality implemented by one or more pieces of program code of the computer program. To comprehensively test the specific functionality, each test script needs to be associated to the one or more pieces of program code that are tested by the test script. Thus, test script repository 110 can be configured to associate a test script to the one or more pieces of program code (e.g., one or more program functions) that implements the specific functionality to be tested, as described below in more detail with respect to FIG. 2. Each test script can be written by utilizing a scripting language (e.g., KornShell (ksh), C shell (csh), Perl) or other programming language (e.g., C, C++, or JAVA).

As mentioned above, computer system 100 includes software testing program 120 having program code scan module 125 and test script consolidation module 130. Program code scan module 125 parses through program code and program code comments of the computer program that is being tested, and identifies each program function of the program code that is affected by a program code change. In addition, for each identified program function, program code scan module 125 determines all program functions of the program code that are called by the identified program function (i.e., program scan module 125 determines all program function calls of the identified program function).

In one embodiment, the program code and program code comments have information in a predetermined format expected by software testing program 120. Particularly, in one embodiment, the predetermined format of the program code comments can begin with a delimiter ##call to, followed by a name of a program function, followed by the delimiter, and so forth. Thus, the program code comments can include information about program function calls and program functions that are making the program function calls, wherein the program functions have been affected by the program code change. Moreover, in one embodiment, the program code comments can be one or more plaintext files that are separate from a file containing the program code. However, in another embodiment, the program code comments can be plaintext that appears before or after the program code or even interposed within the program code in a single file. The program code comments can include delimiters, wherein the delimiters can be utilized by program code scan module 125 to distinguish the program code comments from the program code for the purpose of parsing mentioned above.

In addition, in the disclosed embodiment, program code database 115 stores program code of the computer program being tested and a mapping of relationships between program functions of the program code. The mapping of relationships may be implemented utilizing a file having a predetermined format, a list of program functions affected by the program code change, and one or more identifiers that can be associated with each of the program functions in the list. The identifiers can represent a program function call of one program function to another program function. Thus, a program function call is a relationship between the program functions that can be represented by one of the identifiers. Accordingly, software testing program 120 can utilize the file having the predetermined format, the list of program functions, and the identifiers to determine relationships (e.g., program function calls) of each of the identified program functions affected by the program code change.

Furthermore, in other embodiments, the mapping of relationships may be implemented utilizing one or more database tables, a hash map, or other in-memory data structure (e.g., an array with pointers to data that represent program function calls) for storing program function relationships. Therefore, software testing program 120 can also utilize database tables, a hash map, or other in-memory data structure to determine relationships (e.g., program function calls) of each of the identified program functions affected by the program code change.

In addition, in the disclosed embodiment, test script consolidation module 130 selects one or more test scripts to execute from test script repository 110 based on the identified program functions affected by the program code change, and based on the mapping of relationships between program functions of the program code. Subsequently, test script consolidation module 130 consolidates the one or more test scripts into a test suite (i.e., a single executable test script) that can be utilized to comprehensively test the functionality of the computer program affected by the program code change.

Figure 2:
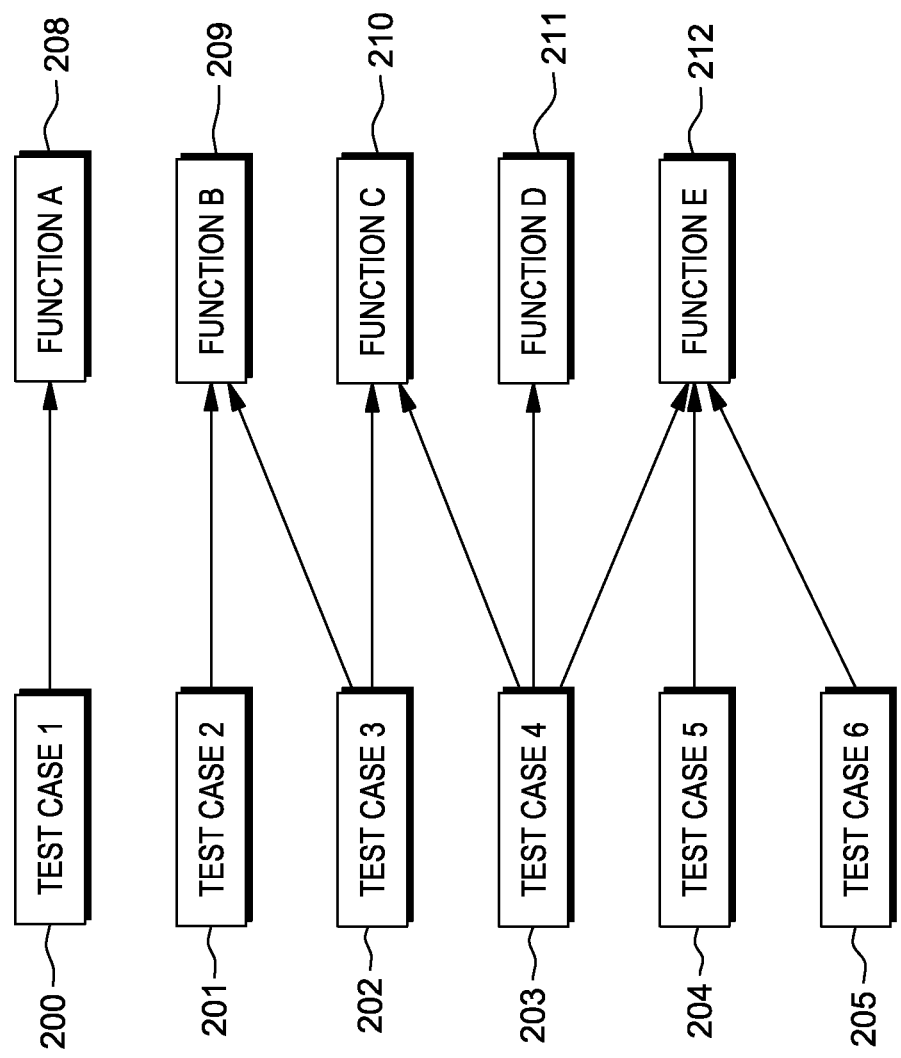
FIG. 2 is a block diagram illustrating the test script repository configured to associate test scripts to one or more program functions that implement the specific functionality to be tested according to an embodiment of the present invention.

FIG. 2 illustrates the test script repository configured to associate test scripts to one or more program functions that implement the specific functionality to be tested. In the disclosed embodiment, test script repository 110 includes test scripts 200-205 having associations with at least one of program functions 208-212. Specifically, test scripts 200-205 are associated with the program functions that they test. Thus, test script 200 tests program function 208, test script 201 tests program function 209, test script 202 tests program functions 209-210, test script 203 tests program functions 210-212, test script 204 tests program function 212, and test script 205 tests program function 212. Although only six test scripts and five program functions are represented, test scripts may be added to or removed from test script repository 110 based on desired testing needs.

Figure 3:
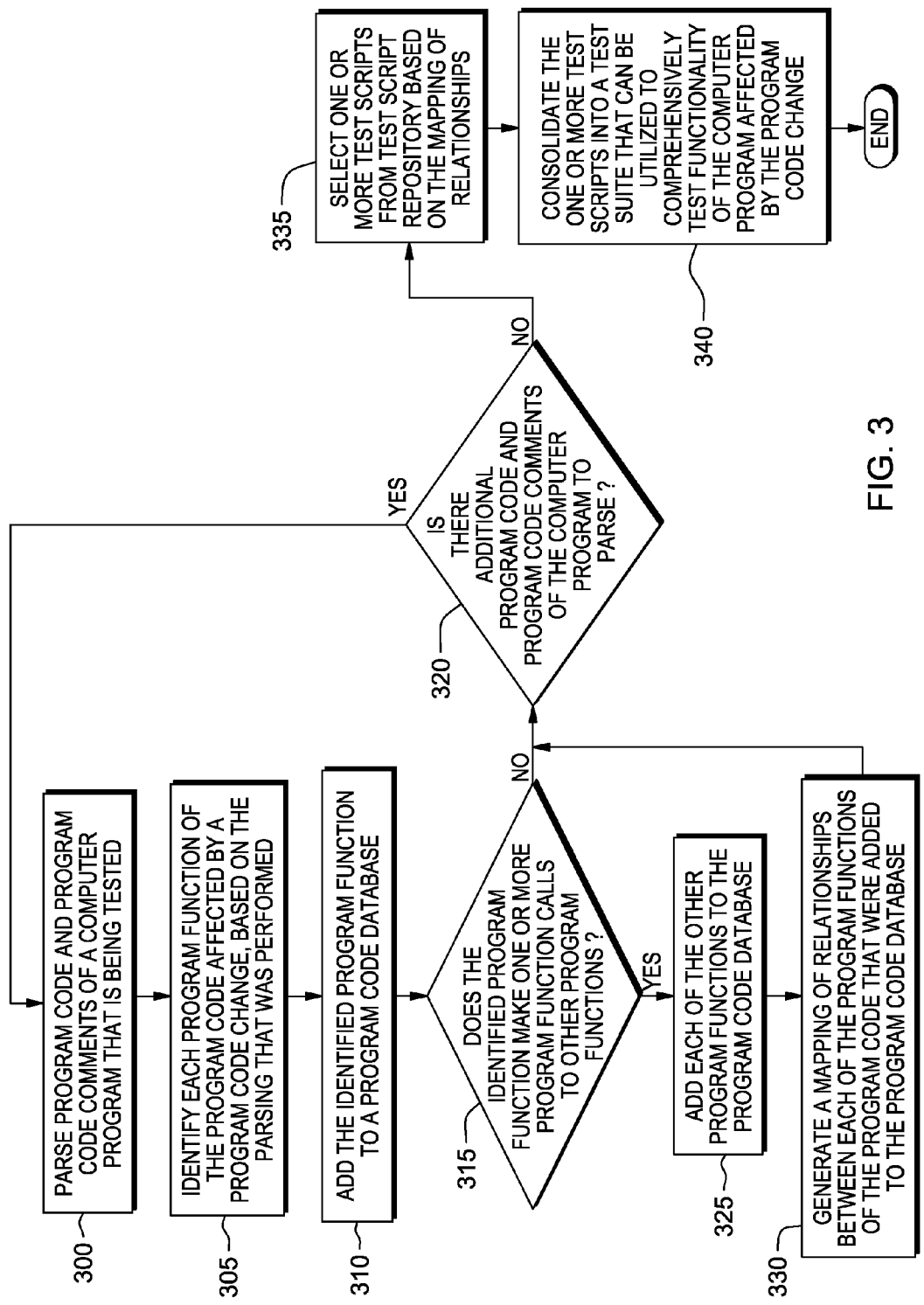
FIG. 3 is a flowchart illustrating operations of the software testing program according to an embodiment of the present invention.

FIG. 3 is a flowchart illustrating steps of software testing program 120. Program code scan module 125, of software testing program 120, parses program code and program code comments of a computer program that is being tested (block 300). Subsequently, program code scan module 125 identifies each program function of the program code affected by a program code change, based on the parsing that was performed (block 305). Next, software testing program 120 adds the identified program function to program code database 115 (block 310). Thus, program code database 115 can store program code of the computer program being tested. Based on the parsing performed, if program code scan module 125 determines that the identified program function does not make one or more program function calls to other program functions (the "NO" branch of decision block 315), then program code scan module 125 determines if there is additional program code and program code comments of the computer program to parse (decision block 320). Otherwise, if program code scan module 125 determines that the identified program function makes one or more program function calls to other program functions (the "YES" branch of decision block 315), then software testing program 120 adds each of the other programs functions to program code database 115 (block 325).

Next, in the disclosed embodiment, software testing program 120 generates a mapping of relationships between each of the program functions of the program code that were added to program code database 115 (block 330). In the disclosed embodiment, the mapping of relationships is implemented utilizing a file, stored in program code database 115, having a predetermined format, a list of program functions affected by the program code change, and one or more identifiers that can be associated with each of the program functions in the list. The identifiers can represent a program function call of one program function to another program function, wherein the program function call is a relationship between the program functions that can be represented by one of the identifiers. Accordingly, software testing program 120 can utilize the file having the predetermined format, the list of program functions, and the identifiers to determine relationships (e.g., program function calls) of each of the identified program functions affected by the program code change. Moreover, the mapping of relationships can be subsequently utilized by test script consolidation module 130 to determine test scripts to retrieve from test script repository 110, in order to comprehensively test the computer program. In the disclosed embodiment the mapping of relationships is implemented utilizing a file, but in other embodiments the mapping of relationships may be implemented utilizing one or more database tables, a hash map, or other in-memory data structure (e.g., an array with pointers to data that represent program function calls) for storing program function relationships.

Next, software testing program 120 determines if there is additional program code and program code comments of the computer program to parse (decision block 320). If there is additional program code and program code comments of the computer program to parse ("YES" branch of decision block 320), then program code scan module 125 continues and parses the additional program code and program code comments (block 300). Otherwise, if there is no additional program code and program code comments of the computer program to parse ("NO" branch of decision block 320), then test script consolidation module 130 selects one or more test scripts from test script repository 110 based on the mapping of relationships between program functions of the program code (block 335). Specifically, the one or more test scripts that are selected can test functionality of each program function represented within the mapping of relationships generated by software testing program 120. So, for example, if the program code includes program function A that calls program function B, then test script consolidation module can query the test script repository for all test scripts associated to program function A and/or program function B, wherein each of the test scripts test the functionality of the program function A, the program function B, or a combination of program functions A and B. Specifically, the one or more test scripts can be selected by performing a query against test script repository 110 based on each of the program functions that are represented in the mapping of relationships, wherein in response to the query test script repository 110 returns the one or more test scripts that are associated to the program functions.

Subsequently, test script consolidation module 130 consolidates the one or more test scripts into a test suite (i.e., a single executable test script) that can be utilized to comprehensively test functionality of the computer program affected by the program code change (block 340). In alternative embodiments, test script consolidation module 130 can generate the test suite incrementally by retrieving one or more test scripts from test script repository 110 after each program function affected by the program code change is added to program code database 115 and a mapping of relationships is generated by software testing program 120, wherein the test scripts retrieved can be determined by utilizing the mapping of relationships.

Figure 4:
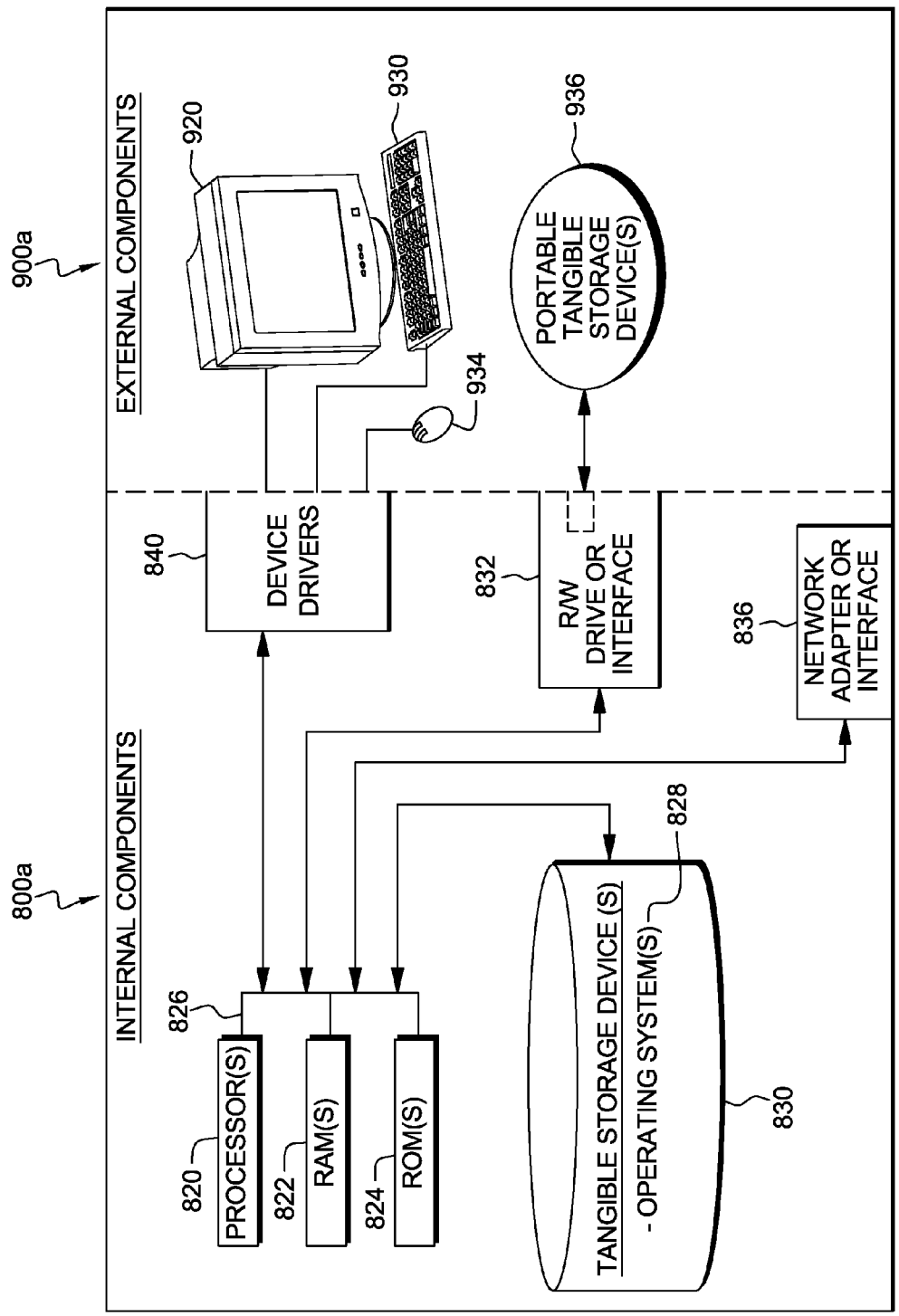
FIG. 4 is a block diagram depicting internal and external components of the computer of FIG. 1 according to an embodiment of the present invention.

FIG. 4 is block diagram 300 depicting a set of internal components 800a and a set of external components 900a that correspond to computer 105. Internal components 800a includes one or more processors 820, one or more computer-readable RAMs 822, one or more computer-readable ROMs 824 on one or more buses 826, and one or more operating systems 828 and one or more computer-readable tangible storage devices 830. The one or more operating systems 828, test script repository 110, program code database 115, and software testing program 120 having program code scan module 125 and test script consolidation module 130 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 800a includes a R/W drive or interface 832 to read from and write to one or more portable computer-readable tangible storage devices 936 such as CD-ROM, DVD, memory stick, magnetic tape, magnetic disk, optical disk or semiconductor storage device. Test script repository 110, program code database 115, and software testing program 120 having program code scan module 125 and test script consolidation module 130 can be stored on one or more of the respective portable computer-readable tangible storage devices 936, read via the respective R/W drive or interface 832 and loaded into respective computer-readable tangible storage devices 830.

Furthermore, the set of internal components 800a also include a network adapter or interface 836 such as TCP/IP adapter card, wireless wi-fi interface card, or 3G or 4G wireless interface card or other wired or wireless communication link. Test script repository 110, program code database 115, and software testing program 120 having program code scan module 125 and test script consolidation module 130 can be downloaded to respective computer 105 from an external computer or external storage device via a network (for example, the Internet, a LAN, or a WAN) and respective network adapter or interface 836. From the network adapter or interface 836, test script repository 110, program code database 115, and software testing program 120 having program code scan module 125 and test script consolidation module 130 are loaded into respective computer-readable tangible storage devices 830. The network may comprise copper wires, optical fibers, wireless transmission, routers, firewalls, switches, gateway computers and/or servers.

The set of external components 900a can include a computer display monitor 920, a keyboard 930, and a computer mouse input device 934. External components 900a can also include touch screens, virtual keyboards, touch pads, pointing devices, and other human interface devices. The set of internal components 800a also includes device drivers 840 to interface to computer display monitor 920, keyboard 930 and computer mouse input device 934. The device drivers 840, R/W drive or interface 832 and network adapter or interface 836 comprise hardware and software in which the software is stored in computer-readable tangible storage device 830 and/or ROM 824.

It should be appreciated that FIG. 4 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for comprehensively testing functionality of a computer program based on a change to program code of the computer program. However, numerous modifications substitutions can be made without deviating from the scope of an embodiment of the invention. Therefore, one or more embodiments of the invention have been disclosed by way of example and not limitation.

What is claimed is:

1. A method for testing functionality of a computer program based on at least one change to program code of the computer program comprising:
   a computer identifying one or more program functions within program code of a computer program affected by a program code change;
   the computer identifying program function calls made by the one or more program functions to other program functions;
   the computer adding the one or more program functions and program function calls to a program code database;
   the computer generating a mapping of relationships between the program functions of the program code;
   the computer querying a repository based on each of the program functions that are represented in the mapping of relationships, in order to retrieve one or more test scripts, wherein each test script can test the functionality of all the program functions that are represented in the mapping of relationships; and
   the computer consolidating the one or more test scripts into a test suite that comprehensively tests functionality of the computer program.

2. The method of claim 1, wherein the program code comprises program code comments having information in a predetermined format such that the program code comments begin with a delimiter, followed by a name of a program function, followed by the delimiter.

3. The method of claim 1, wherein the computer identifying the one or more program functions comprises parsing the program code and program code comments of the computer program affected by a program code change.

4. The method of claim 1, wherein the computer identifying program function calls made by the one or more program functions to other program functions comprises parsing the program code and the program code comments of the computer program affected by a program code change.

5. The method of claim 1, wherein the mapping of relationships represents the program functions and the program function calls made by the program functions.

6. A computer program product for testing functionality of a computer program based on at least one change to program code of the computer program comprising:
   a computer readable hardware storage medium and program instructions stored on the computer readable hardware storage medium, the program instructions comprising:
   program instructions to identify one or more program functions within program code of a computer program affected by a program code change;
   program instructions to identify program function calls made by the one or more program functions to other program functions;
   program instructions to add the one or more program functions and program function calls to a program code database;
   program instructions to generate a mapping of relationships between the program functions of the program code;
   program instructions to query a repository based on each of the program functions that are represented in the mapping of relationships, in order to retrieve the one or more test scripts, wherein each test script can test the functionality of all the program functions that are represented in the mapping of relationships; and
   program instructions to consolidate the one or more test scripts into a test suite that comprehensively tests functionality of the computer program.

7. The computer program product of claim 6, wherein the program code comprises program code comments having information in a predetermined format such that the program code comments begin with a delimiter, followed by a name of a program function, followed by the delimiter.

8. The computer program product of claim 6, wherein the program instructions to identify the one or more program functions comprises parsing the program code and program code comments of the computer program affected by a program code change.

9. The computer program product of claim 6, wherein the program instructions to identify program function calls made by the one or more program functions to other program functions comprises parsing the program code and the program code comments of the computer program affected by a program code change.

10. The computer program product of claim 6, wherein the mapping of relationships represents the program functions and the program function calls made by the program functions.

11. A computer system for testing functionality of a computer program based on at least one change to program code of the computer program comprising:
   one or more processors, one or more computer readable memories, one or more computer readable storage media, and program instructions stored on the one or more storage media for execution by the one or more processors via the one or more memories, the program instructions comprising:
   program instructions to identify one or more program functions within program code of a computer program affected by a program code change;
   program instructions to identify program function calls made by the one or more program functions to other program functions;
   program instructions to add the one or more program functions and program function calls to a program code database;
   program instructions to generate a mapping of relationships between the program functions of the program code;
   program instructions to query a repository based on each of the program functions that are represented in the mapping of relationships, in order to retrieve the one or more test scripts, wherein each test script can test the functionality of all the program functions that are represented in the mapping of relationships; and
   program instructions to consolidate the one or more test scripts into a test suite that comprehensively tests functionality of the computer program.

12. The computer system of claim 11, wherein the program code comprises program code comments having information in a predetermined format such that the program code comments begin with a delimiter, followed by a name of a program function, followed by the delimiter.

13. The computer system of claim 11, wherein the program instructions to identify the one or more program functions comprises parsing the program code and program code comments of the computer program affected by a program code change.

14. The computer system of claim 11, wherein the program instructions to identify program function calls made by the one or more program functions to other program functions comprises parsing the program code and the program code comments of the computer program affected by a program code change.

15. The computer system of claim 11, wherein the mapping of relationships represents the program functions and the program function calls made by the program functions.

* * * * *